US010432855B1

(12) United States Patent
Jenny et al.

(10) Patent No.: US 10,432,855 B1
(45) Date of Patent: Oct. 1, 2019

(54) SYSTEMS AND METHODS FOR DETERMINING KEY FRAME MOMENTS TO CONSTRUCT SPHERICAL IMAGES

(71) Applicant: GOPRO, INC., San Mateo, CA (US)

(72) Inventors: Alexandre Jenny, Challes les eaux (FR); Renan Coudray, Montmélian (FR); Antoine Méler, Chapareillan (FR); Thomas Vuillermet, Curienne (FR)

(73) Assignee: GoPro, Inc., San Mateo, CA (US)

( * ) Notice: Subject to any disclaimer, the term of this patent is extended or adjusted under 35 U.S.C. 154(b) by 209 days.

(21) Appl. No.: 15/160,983

(22) Filed: May 20, 2016

(51) Int. Cl.
*H04N 5/232* (2006.01)
*H04N 5/265* (2006.01)
*H04N 5/04* (2006.01)
*G06T 7/20* (2017.01)

(52) U.S. Cl.
CPC ....... *H04N 5/23238* (2013.01); *G06T 7/2093* (2013.01); *H04N 5/04* (2013.01); *H04N 5/265* (2013.01); *G06T 2207/10016* (2013.01)

(58) Field of Classification Search
CPC ........ G06T 2207/10016; G06T 7/2093; H04N 5/23238; H04N 5/04; H04N 5/265
See application file for complete search history.

(56) References Cited

U.S. PATENT DOCUMENTS

| | | | |
|---|---|---|---|
| 5,260,779 A | 11/1993 | Wasserman | |
| 5,555,895 A | 9/1996 | Ulmer | |
| 6,389,179 B1 * | 5/2002 | Katayama | G06T 3/4038 348/36 |
| 7,057,663 B1 | 6/2006 | Lee | |
| 9,948,919 B2 * | 4/2018 | Jin | H04N 5/23267 |
| 9,998,661 B1 * | 6/2018 | Banta | H04N 5/23238 |
| 10,084,959 B1 * | 9/2018 | Yu | H04N 5/23238 |
| 2003/0098954 A1 | 5/2003 | Amir | |
| 2005/0088534 A1 * | 4/2005 | Shen | H04N 1/3876 348/218.1 |
| 2006/0291720 A1 * | 12/2006 | Malvar | H04N 1/64 382/166 |
| 2007/0019946 A1 * | 1/2007 | Clemens | G03B 17/00 396/322 |
| 2007/0053659 A1 | 3/2007 | Kiyama | |
| 2007/0300249 A1 | 12/2007 | Smith | |
| 2009/0210707 A1 | 8/2009 | De Lutiis | |
| 2009/0271447 A1 | 10/2009 | Shin | |

(Continued)

*Primary Examiner* — Gelek W Topgyal
(74) *Attorney, Agent, or Firm* — Esplin & Associates, PC

(57) ABSTRACT

Multiple video segments, including multiple frames, may be obtained. The video segments may be time synchronized for at least portions of the video segments captured during a synchronized time period. A first key frame moment may be set with the synchronized time period. A first set of construction parameter values may be determined for the frames captured during the first key frame moment. A first set of spherical images may be constructed using the first set of construction parameter values. A change may be detected in the construction parameter values at a moment in time subsequent to the first key frame moment, which may be identified as a second key frame moment. A second set of construction parameter values may be determined for the frames captured during the second key frame moment. The second set of spherical images may be constructed using the second set of construction parameter values.

20 Claims, 4 Drawing Sheets

(56) References Cited

U.S. PATENT DOCUMENTS

| | | |
|---|---|---|
| 2013/0021450 A1 | 1/2013 | Yoshizawa |
| 2013/0141526 A1* | 6/2013 | Banta ................. H04N 5/23238 348/38 |
| 2014/0049601 A1* | 2/2014 | Pfeil ................... H04N 5/23238 348/36 |
| 2014/0168475 A1* | 6/2014 | Corkery ................. G03B 37/04 348/239 |
| 2014/0192144 A1* | 7/2014 | St. Clair ............ H04N 5/23238 348/36 |
| 2015/0142742 A1 | 5/2015 | Hong |
| 2015/0256808 A1* | 9/2015 | MacMillan .......... H04N 21/233 348/43 |
| 2015/0288754 A1 | 10/2015 | Mosko |
| 2016/0050368 A1* | 2/2016 | Seo ........................... G06T 7/11 348/36 |
| 2016/0088287 A1* | 3/2016 | Sadi ....................... H04N 19/54 348/43 |
| 2016/0098469 A1 | 4/2016 | Allinson |
| 2016/0165563 A1 | 6/2016 | Jang |
| 2016/0286138 A1* | 9/2016 | Kim .................... H04N 5/23238 |
| 2016/0352791 A1* | 12/2016 | Adams ................ H04L 65/4069 |
| 2016/0353089 A1* | 12/2016 | Gallup ............... G02B 27/0172 |
| 2017/0142337 A1* | 5/2017 | Kokaram ........... H04N 5/23238 |

* cited by examiner

SYSTEMS AND METHODS FOR DETERMINING KEY FRAME MOMENTS TO CONSTRUCT SPHERICAL IMAGES

FIELD

The disclosure relates to systems and methods for determining key frame moments to construct spherical images.

BACKGROUND

Users may capture multiple videos simultaneously with multiple image capturing devices in order to capture multiple fields of view exceeding the human vision field of view. The image capturing devices may be oriented in different directions, so as to obtain video segments of the environment at the same moments in time. The multiple videos may be combined to generate a single video, referred to as a spherical video and/or a wide field video. This combination process may be referred to as stitching. Stitching techniques may often require numerous manual operations by a user.

SUMMARY

One aspect of the disclosure relates to a system for determining key frame moments to construct spherical images, in accordance with one or more implementations. The system may obtain multiple video segments. Individual video segments may include multiple frames (e.g., still images that make up the video segment). The video segments may be time synchronized. A first key frame moment may be set within the synchronized time period. A first set of construction parameter values may be determined for the frames of the individual video segments captured during the first key frame moment. The first set of construction parameter values may be used to construct a first set of spherical images, also referred to as stitching. The system may detect a change in one or more of the construction parameter values at a moment in time subsequent to the first key frame moment. The moment in time in which the change in one or more of the construction parameter values is detected may be identified as a second key frame moment. A second set of construction parameter values may be determined for the second key frame moment. The second set of construction parameter values may be used to construct a second set of spherical images. A final product of a spherical video segment may include the constructed spherical images.

In some implementations, the system may include one or more servers. The server(s) may be configured to communicate with one or more client computing platforms according to a client/server architecture. The users of the system may access the system via client computing platform(s). The server(s) may be configured to execute one or more computer program components. The computer program components may include one or more of a video segment component, an authentication component, a key frame component, a parameters component, a construction component, and/or other components.

The video segment component may be configured to obtain multiple video segments. Multiple video segments may include more than one video segment. The multiple video segments may be included within a repository of video segments. A repository of images and/or video segments may be available via the system. The repository of images and/or video segments may be stored within an electronic storage, one or more server(s), one or more client computing platform(s), external resources, a cloud, and/or any other storage location. Individual images and/or video segments of the repository of images and/or video segments may be stored in different locations. The repository of images and/or video segments may be associated with different users. The video segments may include a compilation of videos, video segments, video clips, and/or still images.

Individual video segments may include multiple frames. Individual video segments may be composed of many still images, also known as frames. The frames may compose a moving picture, such as video content of a video segment. The video segment may include a playback of live captured video segment (e.g., captured via one or image capture devices).

The various video segments may be generated by multiple image capture devices. The multiple image capture devices may include a camera. The term camera may refer to any imaging device or sensor configured to capture, record, and/or convey still and/or video imagery, which may be sensitive to visible parts of the electromagnetic spectrum and/or invisible parts of the electromagnetic spectrum (e.g., infrared, ultraviolet, and/or other invisible ranges). The multiple image capture devices may be fastened to a holder, or otherwise known as a "rig". A rig may include a holder for the multiple image capture devices where the axes of the field of vision of at least two adjacent image capture devices may be oriented in a substantially perpendicular direction so that the image capture devices may be able to film a plurality of views of a particular environment. The various image capture devices on the rig may be considered to be fixed relative to one another.

The individual video segments may be time synchronized for at least portions of the individual video segments captured during a synchronized time period.

The authentication component may be configured to authenticate a user associated with client computing platform(s) accessing the repository of images and/or video segments via the system. The authentication component may manage accounts associated with users and/or consumers of the system. The user accounts may include user information associated with users and/or consumers of the user accounts. User information may include information stored by server (s), client computing platform(s), and/or other storage locations.

The key frame component may be configured to set a first key frame moment within the synchronized time period. The first key frame moment may be a reference point in time within the synchronized time period of the individual video segments to aid in construction of the spherical images. The first key frame moment may refer to a period of time or a point in time within the synchronized time period of the individual video segments. The first key frame moment may refer to a particular frame at the same point in time within the synchronized time period of the individual video segments.

The parameters component may be configured to determine a first set of construction parameter values for the frames of the individual video segments captured during the first key frame moment. Values of construction parameters may be determined from one or more of the video segments, frames of the video segments, settings of the image capture devices, and/or other information. One or more of the construction parameter values may include one or more of a position parameter, an image capture device parameter (e.g., a camera parameter), a color parameter, a stabilization parameter, an exposure parameter, and/or other parameters.

The construction component may be configured to construct, using the first set of construction parameter values, a first set of spherical images. A spherical image may include a wide-angle panoramic image. The spherical image may include one or more of a 360-degree horizontal field of view, a 180-degree vertical field of view, and/or other views. The spherical image may include visual information and audio information.

The parameters component may be configured to detect a change in the construction parameter values of the individual video segments relative to the first set of construction parameter values at a moment in time subsequent to the first key frame moment. The parameters component may be configured to compare construction parameter values of individual frames of the individual video segments at a moment in time subsequent to the first key frame moment to the first set of construction parameter values. If the construction parameter values of individual frames of the individual video segments at a moment in time subsequent to the first key frame moment is not within and/or above a predefined threshold for a particular construction parameter value, the parameters component may be configured to detect the change in the construction parameter values. The threshold may be manually predefined for one or more of the construction parameter values via a user using one or more client computing platform(s) such that the user may define when the construction parameter values may change in order to construct spherical images subsequent to the first key frame moment. The threshold may be automatically predefined for one or more of the construction parameter values by the system.

The key frame component may be configured to identify, based on the detected change in the construction parameter values of the individual video segments relative to the first set of construction parameter values, the moment in time subsequent to the first key frame moment as a second key frame moment. The second key frame moment may be a reference point in time within the synchronized time period of the individual video segments to aid in construction of the spherical images subsequent to the first key frame moment. The second key frame moment may refer to a period of time or a point in time within the synchronized time period of the individual video segments subsequent to the first key frame moment. For example, if the first key frame moment is set at 0.01 seconds within the synchronized time period of the individual video segments, then the second key frame moment may be identified as 6.8 seconds within the synchronized time period of the individual video segments. The second key frame moment may refer to a particular frame at the same moment in time within the synchronized time period of the individual video segments subsequent to the first key frame moment.

The parameters component may be configured to determine a second set of construction parameter values for the frames of the individual video segments captured during the second key frame moment. The second set of construction parameter values may be determined for the frames of the individual video segments captured during the second key frame moment in a similar manner as the parameters component may be configured to determine the first set of construction parameter values for the frames of the individual video segments captured during the first key frame moment. When the parameters component determines that any one of the construction parameter values have changed beyond the predefined threshold after the first key frame moment at a particular moment in time for any individual frame within any of the individual video segments, the parameters component may determine the second set of construction parameter values for the frames of the individual video segments captured during that particular moment in time (e.g., the second key frame moment).

The construction component may be configured to construct, using the second set of construction parameter values, a second set of spherical images. The second set of spherical images may include one or more spherical images. The second set of spherical images may include a second spherical image constructed from the frames of the individual video segments captured during the second key frame moment and/or at least one other spherical image from the frames of the individual video segments captures at a moment adjacent or near the second key frame moment. For example, the at least one other spherical image from the frames of the individual video segments captured at a moment adjacent or near the second key frame moment may include constructing the at least other spherical image from a frame preceding and/or proceeding the frame used to construct the second spherical image. The second set of construction parameter values may be used to construct the at least other spherical image included within the second set of spherical images.

These and other objects, features, and characteristics of the system and/or method disclosed herein, as well as the methods of operation and functions of the related elements of structure and the combination of parts and economies of manufacture, will become more apparent upon consideration of the following description and the appended claims with reference to the accompanying drawings, all of which form a part of this specification, wherein like reference numerals designate corresponding parts in the various figures. It is to be expressly understood, however, that the drawings are for the purpose of illustration and description only and are not intended as a definition of the limits of the invention. As used in the specification and in the claims, the singular form of "a", "an", and "the" include plural referents unless the context clearly dictates otherwise.

DETAILED DESCRIPTION

Figure 1:
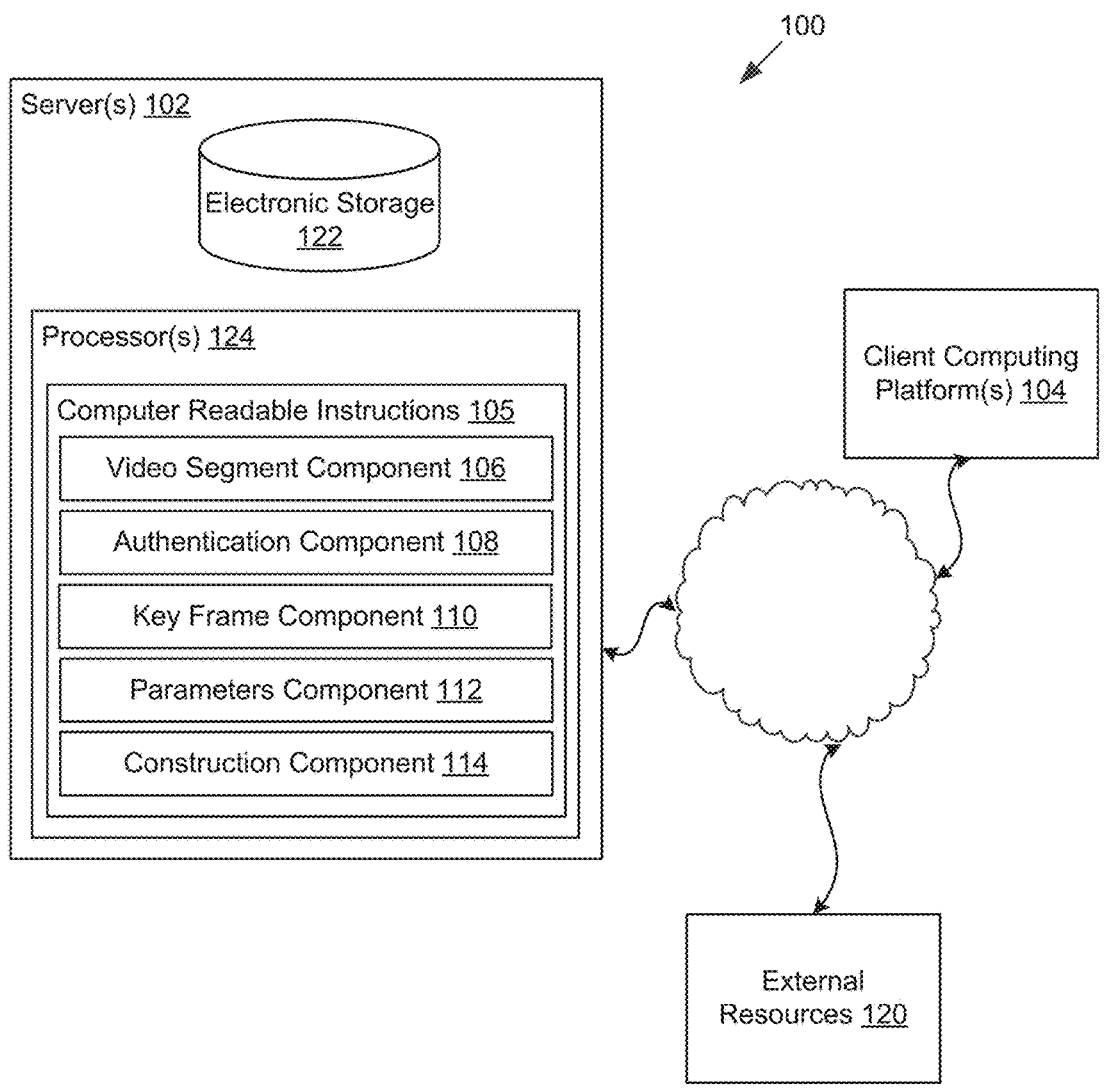
FIG. 1 illustrates a system for determining key frame moments to construct spherical images, in accordance with one or more implementations.

FIG. 1 illustrates a system 100 for determining key frame moments to construct spherical images, in accordance with one or more implementations. System 100 may obtain multiple video segments. Individual video segments may include multiple frames (e.g., still images that make up the video segment). The video segments may be time synchronized. A first key frame moment may be set within the synchronized time period. A first set of construction parameter values may be determined for the frames of the individual video segments captured during the first key frame moment. The first set of construction parameter values may be used to construct a first set of spherical images, also referred to as stitching. System 100 may detect a change in one or more of the construction parameter values at a moment in time subsequent to the first key frame moment. The moment in time in which the change in one or more of the construction parameter values is detected may be identified as a second key frame moment. A second set of construction parameter values may be determined for the second key frame moment. The second set of construction parameter values may be used to construct a second set of spherical images. A final product of a spherical video segment may include the constructed spherical images.

As is illustrated in FIG. 1, system 100 may include one or more server(s) 102. Server(s) 102 may be configured to communicate with one or more client computing platform(s) 104 according to a client/server architecture. The users of system 100 may access system 100 via client computing platform(s) 104. Server(s) 102 may be configured to execute one or more computer program components. The computer program components may include one or more of video segment component 106, authentication component 108, key frame component 110, parameters component 112, construction component 114, and/or other components.

In some implementations, server(s) 102 may be configured to provide remote hosting of the features and/or function of machine-readable instructions 105 to one or more client computing platform(s) 104 that may be remotely located from server(s) 102. However, in some implementations, one or more features and/or functions of server(s) 102 may be attributed as local features and/or functions of one or more client computing platform(s) 104. For example, individual ones of client computing platform(s) 104 may include machine-readable instructions (not shown in FIG. 1) comprising the same or similar components as machine-readable instructions 105 of server(s) 102. Client computing platform(s) 104 may be configured to locally execute the one or more components that may be the same or similar to the machine-readable instructions 105. One or more features and/or functions of machine-readable instructions 105 of server(s) 102 may be provided, at least in part, as an application program that may be executed at a given client computing platform 104. For example, an image capturing device capturing a video segment may be configured to locally execute the one or more components that may be the same or similar to the machine-readable instructions 105 in or near real-time.

Client computing platform(s) 104 may include one or more of a cellular telephone, a smartphone, a digital camera, a laptop, a tablet computer, a desktop computer, a television set-top box, smart TV, a gaming console, and/or other computing platforms.

Server(s) 102, client computing platform(s) 104, and/or external resources 120 may be operatively linked via one or more electronic communication links. For example, such electronic communication links may be established, at least in part, via a network such as the Internet and/or other networks. It will be appreciated that this is not intended to be limiting and that the scope of this disclosure includes implementations in which server(s) 102, client computing platform(s) 104, and/or external resources 120 may be operatively linked via some other communication media.

Video segment component 106 may be configured to obtain multiple video segments. Multiple video segments may include more than one video segment. The multiple video segments may be included within a repository of video segments. A repository of images and/or video segments may be available via system 100. The repository of images and/or video segments may be stored within electronic storage 122, one or more server(s) 102, one or more client computing platform(s) 104, external resources 120, a cloud, and/or any other storage location. Individual images and/or video segments of the repository of images and/or video segments may be stored in different locations. The repository of images and/or video segments may be associated with different users. The video segments may include a compilation of videos, video segments, video clips, and/or still images. While the present disclosure may be directed to previously captured video segments captured by one or more image capturing devices, one or more other implementations of system 100, server(s) 102, and/or client computing platform(s) 104 may be configured for other types of media items. Other types of media items may include one or more of audio files (e.g., music, podcasts, audio books, and/or other audio files), multimedia presentations, slideshows, and/or other media files. The multiple video segments may be obtained from one or more storage locations associated with server(s) 102, client computing platform(s) 104, and/or other storage locations where video segments may be stored.

Individual video segments may include multiple frames. Individual video segments may be composed of many still images, also known as frames. The frames may compose a moving picture, such as video content of a video segment. The video segment may include a playback of live captured video segment (e.g., captured via one or image capture devices).

The various video segments may be generated by multiple image capture devices. The multiple image capture devices may include a camera. The term camera may refer to any imaging device or sensor configured to capture, record, and/or convey still and/or video imagery, which may be sensitive to visible parts of the electromagnetic spectrum and/or invisible parts of the electromagnetic spectrum (e.g., infrared, ultraviolet, and/or other invisible ranges). The multiple image capture devices may be fastened to a holder, or otherwise known as a "rig". A rig may include a holder for the multiple image capture devices where the axes of the field of vision of at least two adjacent image capture devices may be oriented in a substantially perpendicular direction so that the image capture devices may be able to film a plurality of views of a particular environment. The various image capture devices on the rig may be considered to be fixed relative to one another.

The individual video segments may be time synchronized for at least portions of the individual video segments captured during a synchronized time period. Individual image capture devices may include an internal clock. The various video segments may be offset in time. The individual video segments may be time synchronized based upon a soundtrack of the individual video segments. For example, video segment component 106 may be configured to recognize and/or identify identical sounds within a time period of the individual video segments and synchronize the individual video segments based upon the identical sounds.

In some embodiments, video segment component 106 may be configured to synchronize the individual video segments by time. A first video segment may be chosen as a reference video segment. The reference video segment may be chosen based upon the reference video segment having started last in time with reference to the other video segments. In this manner, the other video segments may be synchronized with the reference video segment. In some embodiments, the video segments may be manually synchronized by time.

In some embodiments, video segment component 106 may obtain the multiple video segments already time synchronized. For example, image capture devices with a common internal clock may time stamp the video segments such that the video segments may already be time synchronized and may not require synchronization by system 100.

Authentication component 108 may be configured to authenticate a user associated with client computing platform(s) 104 accessing the repository of images and/or video segments via system 100. Authentication component 108 may manage accounts associated with users and/or consumers of system 100. The user accounts may include user information associated with users and/or consumers of the user accounts. User information may include information stored by server(s) 102, client computing platform(s) 104, and/or other storage locations.

User information may include one or more of information identifying users and/or consumers (e.g., a username or handle, a number, an identifier, and/or other identifying information), security login information (e.g., a login code or password, a user ID, and/or other information necessary for the user to access server(s) 102), system usage information, external usage information (e.g., usage of one or more applications external to system 100 including one or more online activities such as in social networks and/or other external applications), subscription information, a computing platform identification associated with the user and/or consumer, a phone number associated with the user and/or consumer, privacy settings information, and/or other information related to users and/or consumers.

Authentication component 108 may be configured to obtain user information via one or more client computing platform(s) 104 (e.g., user input via a user interface, etc.). If a user and/or consumer does not have a preexisting user account associated with system 100, a user and/or consumer may register to receive services provided by system 100 via a website, web-based application, mobile application, and/or user application. Authentication component 108 may be configured to create a user ID and/or other identifying information for a user and/or consumer when the user and/or consumer registers. The user ID and/or other identifying information may be associated with one or more client computing platform(s) 104 used by the user and/or consumer. Authentication component 108 may be configured to store such association with the user account of the user and/or consumer. A user and/or consumer may associate one or more accounts associated with social network services, messaging services, and the like with an account provided by system 100.

Users may consume the multiple video segments by viewing the video segments via client computing platform(s) 104 and/or an associated display device. Client computing platform(s) 104 may include one or more display devices configured to display the video segments.

Key frame component 110 may be configured to set a first key frame moment within the synchronized time period. The first key frame moment may be a reference point in time within the synchronized time period of the individual video segments to aid in construction of the spherical images. The first key frame moment may refer to a period of time or a point in time within the synchronized time period of the individual video segments. The first key frame moment may refer to a particular frame at the same point in time within the synchronized time period of the individual video segments. Key frame component 110 may be configured to receive a manual selection, via one or more client computing platform(s) 104, of the first key frame moment (e.g., 0.01 seconds into the individual video segments). Key frame component 110 may be configured to set the first key frame moment as the beginning of the individual video segments within the synchronized time period.

Parameters component 112 may be configured to determine a first set of construction parameter values for the frames of the individual video segments captured during the first key frame moment. Values of construction parameters may be determined from one or more of the video segments, frames of the video segments, settings of the image capture devices, and/or other information. One or more of the construction parameter values may include one or more of a position parameter, an image capture device parameter (e.g., a camera parameter), a color parameter, a stabilization parameter, an exposure parameter, and/or other parameters. System 100 may be configured to store the first set of construction parameter values within electronic storage 122 and/or other storage.

The position parameter may include a position of an image capture device relative to other image capture devices. As discussed above, multiple image capture devices may be fastened to a rig. The rig may include a holder for the multiple image capture devices where the axes of the field of vision of at least two adjacent image capture devices may be oriented in a substantially perpendicular direction so that the image capture devices may be able to film a plurality of views of a particular environment. The various image capture devices on the rig may be considered to be fixed relative to one another. Thus, the position parameter may refer to the position of the image capture device that captured the individual video segment relative to the other image capture devices that captured the other video segments.

The image capture device parameter (e.g., the camera parameter) may include one or more of an image distortion, a focal length, sensor/lens misalignment, and/or other information associated with the image capture device that captured the individual video segment. Image distortion may be a result of a position of the image capture device relative to a position of another image capture device and/or a subject within the field of view of one or more image capture devices. For example, when capturing a three-dimensional space into a two-dimensional image or video segment, if the subject being captured is too close to the image capture device, the subject may appear disproportionately large or distorted compared to objects in the background of the subject within the field of view. Image distortion may be the result of parallax. Parallax may refer to the displacement or difference in an apparent position of the subject within two lines of sight (e.g., fields of view of multiple image capturing devices). Individual image capturing devices on a rig with the same centers may capture content without parallax. Individual image capturing devices on a rig with different centers may capture content with parallax.

Determining values of the color parameter for the frames of the individual video segments may include analyzing color data of frames of the individual video segments. Images (e.g., frames) may vary depending on color parameters including one or more of red, blue, green, yellow, hue, intensity, radiance, luminance, brightness, lightness, colorfulness, saturation, and/or other color parameters. For example, one image (e.g., frame) may capture more natural sunlight than another image (e.g., frame), and as such, the frames may vary in color. Analyzing color data of the frames of the individual video segments may include detecting exposure and/or balance differences within the frames of the individual video segments.

Determining values of the color parameter for the frames of the individual video segments may include analyzing a histogram of color data for the frames of the individual video segments. The histogram of the color data for the frames of the individual video segments may represent distribution of the color data within the frames of the individual video segments. For example, the histogram may illustrate a number of pixels for the individual color parameters within the individual frames of the individual video segments to illustrate how often the individual color parameters are present within the individual frames relative to other color parameters within the individual frames.

Determining values of the color parameter for the frames of the individual video segments may include obtaining image parameters from metadata associated with the individual video segments. Image parameters may include one or more of exposure, white balance, noise level, sharpness, saturation, position of the image capture device, orientation of the image capture device, and/or other image parameters. Metadata associated with the individual video segments may be stored with the individual video segments. Parameters component 112 may be configured to obtain the image parameters from the metadata stored with the individual video segments.

Parameters component 112 may be configured to determine the stabilization parameter based upon a stabilization algorithm. For example, shaky movements of the image capture device during capture may be stabilized via the stabilization algorithm. The exposure parameter may include one or more exposure values associated with the individual frames of the individual video segments.

Construction component 114 may be configured to construct, using the first set of construction parameter values, a first set of spherical images. A spherical image may include a wide-angle panoramic image. The spherical image may include one or more of a 360-degree horizontal field of view, a 180-degree vertical field of view, and/or other views. The spherical image may include visual information and audio information.

During construction of the first set of spherical images, multiple frames (e.g., images) may be combined to form a single image (e.g., a single spherical image). Constructing individual spherical images may include processing boundaries between individual frames at a point in time (e.g., the first key frame moment) within the individual video segments from individual image capture devices to construct a continuous and visually indiscernible boundary. That is, the frame at the point in time within each of the individual video segments (each captured by an image capture device with different field of views) may be combined and the boundaries may be processed to form a single spherical image having a 360-degree horizontal field of view and/or a 180-degree vertical field of view. A calculation algorithm may be used to group the frames at the point in time within each of the individual video segments to form a single image (e.g., a spherical image) of a larger format, also known as stitching. Stitching may include complex calculations including a transformation using the construction parameter values to generate the spherical images in order to take into account any differences in color and/or exposure between frames originating from the individual image capture devices. For example, the construction parameter value for exposure may be used to level the exposure for individual frames in order to generate a smooth and consistent exposure within the spherical images within the first key frame moment. In some embodiments, color differences within overlapping areas of individual frames of the individual video segments captured during the first key frame moment that are used to construct the first set of spherical images may be analyzed and/or corrected to generate a smooth and consistent exposure within the spherical images within the first key frame moment.

The first set of spherical images may include one or more spherical images. The first set of spherical images may include a first spherical image constructed from the frames of the individual video segments captured during the first key frame moment and/or at least one other spherical image from the frames of the individual video segments captured at a moment adjacent or near the first key frame moment. For example, the at least one other spherical image from the frames of the individual video segments captured at a moment adjacent or near the first key frame moment may include constructing the at least other spherical image from a frame preceding and/or proceeding the frame used to construct the first spherical image. The first set of construction parameter values may be used to construct the at least other spherical image included within the first set of spherical images. System 100 may be configured to store the first set of spherical images within electronic storage 122 and/or other storage.

Figure 2:
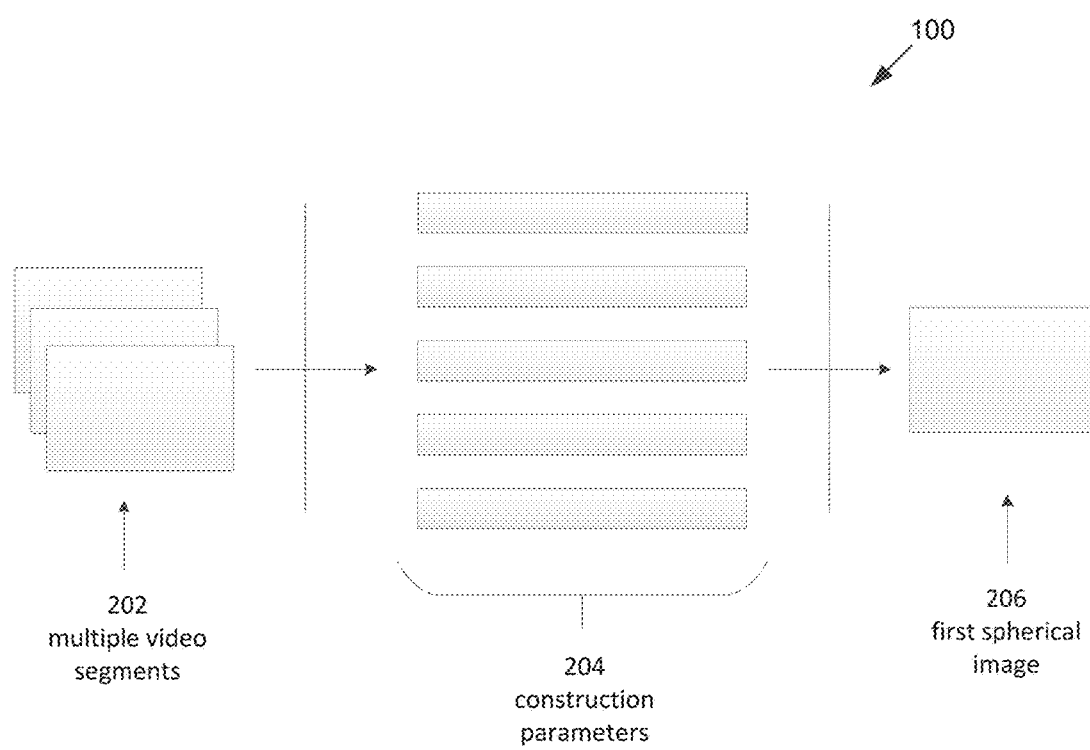
FIG. 2 illustrates an exemplary diagram of the system for determining key frame moments to construct spherical images, in accordance with one or more implementations.

Referring to FIG. 2, system 100 may be configured to receive multiple video segments 202. The individual video segments may be time synchronized for at least portions of the individual video segments captured during a synchronized time period. System 100 may be configured to determine a first set of construction parameter values from construction parameters 204 for the frames of the individual video segments captured during a first key frame moment within the synchronized time period. System 100 may be configured to construct, using the first set of construction parameter values from construction parameters 204, first spherical image 206. First spherical image 206 may be constructed from the frames of the individual video segments captured during the first key frame moment.

Figure 3:
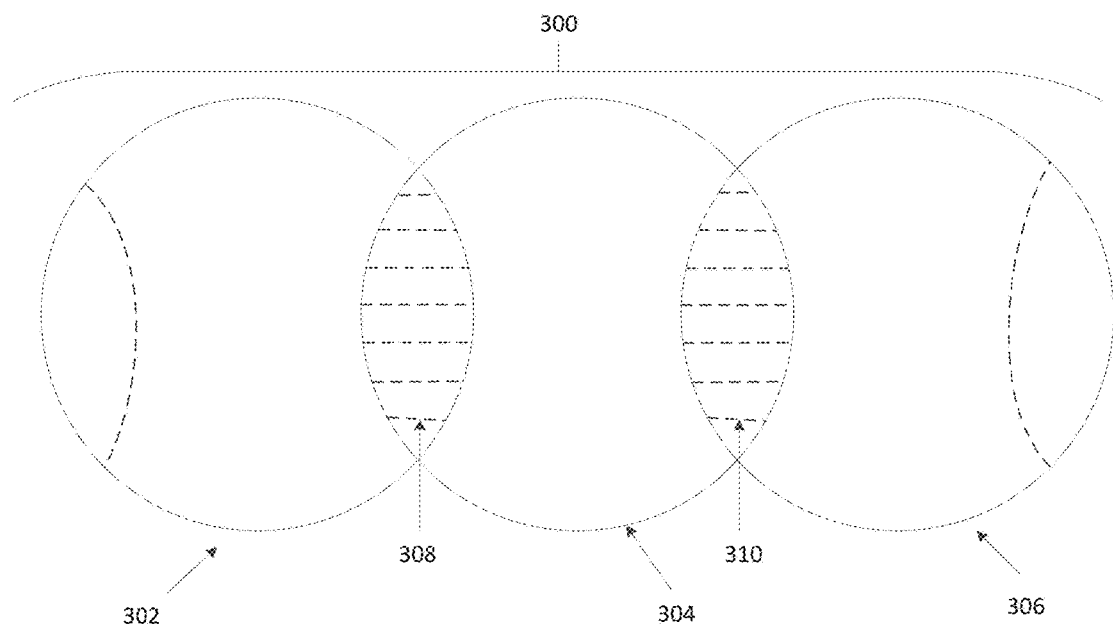
FIG. 3 illustrates exemplary construction of a spherical image, in accordance with one or more implementations.

Referring to FIG. 3, multiple frames (e.g., frames 302, 304, 306) may be combined to form a single image (e.g., spherical image 300). As discussed above, constructing individual spherical images (e.g., single spherical image 300) may include processing boundaries between individual frames 302, 304, 306 at a point in time (e.g., the first key frame moment) within the individual video segments from individual image capture devices to construct a continuous and visually indiscernible boundary. That is, frame 302 may have been obtained from a first video segment, frame 304 may have been obtained from a second video segment, and 306 may have been obtained from a third video segment. Frames 302, 304, and 306 may have been obtained from the same point in time within the synchronized time period of the first video segment, the second video segment, and the third video segment. Some content between individual frames 302, 304, and/or 306 may overlap at regions 308 and/or 310. As such, frames 302, 304, and/or 306 may be combined and the boundaries may be processed to form a single spherical image (e.g., spherical image 300) having a 360-degree horizontal field of view and/or a 180-degree vertical field of view.

Parameters component 112 may be configured to detect a change in the construction parameter values of the individual video segments relative to the first set of construction parameter values at a moment in time subsequent to the first key frame moment. Parameters component 112 may be configured to compare construction parameter values of individual frames of the individual video segments at a moment in time subsequent to the first key frame moment to the first set of construction parameter values. If the construction parameter values of individual frames of the individual video segments at a moment in time subsequent to the first key frame moment is not within and/or above a predefined threshold for a particular construction parameter value, parameters component 112 may be configured to detect the change in the construction parameter values. If the construction parameter values of individual frames of the individual video segments at a moment in time subsequent to the first key frame moment is within and/or below a predefined threshold for a particular construction parameter, parameters component 112 may be configured to not detect the change in the construction parameter values. The threshold may be manually predefined for one or more of the construction parameter values via a user using one or more client computing platform(s) 104 such that the user may define when the construction parameter values may change in order to construct spherical images subsequent to the first key frame moment. The threshold may be automatically predefined for one or more of the construction parameter values by system 100.

The change in the construction parameter values may occur within at least one of the individual video segments. For example, if the exposure from the first set of construction parameter values changes drastically within a frame of at least one of the video segments at a moment in time subsequent to the first key frame moment (e.g., the exposure is not within and/or above a predefined threshold for exposure), parameters component 112 may be configured to detect the change in exposure at that moment in time.

Key frame component 110 may be configured to identify, based on the detected change in the construction parameter values of the individual video segments relative to the first set of construction parameter values, the moment in time subsequent to the first key frame moment as a second key frame moment. The second key frame moment may be a reference point in time within the synchronized time period of the individual video segments to aid in construction of the spherical images subsequent to the first key frame moment. The second key frame moment may refer to a period of time or a point in time within the synchronized time period of the individual video segments subsequent to the first key frame moment. For example, if the first key frame moment is set at 0.01 seconds within the synchronized time period of the individual video segments, then the second key frame moment may be identified as 6.8 seconds within the synchronized time period of the individual video segments. The second key frame moment may refer to a particular frame at the same moment in time within the synchronized time period of the individual video segments subsequent to the first key frame moment. In some embodiments, key frame component 110 may be configured to receive a manual selection, via one or more client computing platform(s) 104, of the second key frame moment.

Parameters component 112 may be configured to determine a second set of construction parameter values for the frames of the individual video segments captured during the second key frame moment. The second set of construction parameter values may be determined for the frames of the individual video segments captured during the second key frame moment in a similar manner as parameters component 112 may be configured to determine the first set of construction parameter values for the frames of the individual video segments captured during the first key frame moment. When parameters component 112 determines that any one of the construction parameter values have changed beyond the predefined threshold after the first key frame moment at a particular moment in time for any individual frame within any of the individual video segments, parameters component 112 may determine the second set of construction parameter values for the frames of the individual video segments captured during that particular moment in time (e.g., the second key frame moment). System 100 may be configured to store the second set of construction parameter values within electronic storage 122 and/or other storage.

Construction component 114 may be configured to construct, using the second set of construction parameter values, a second set of spherical images. The second set of spherical images may include one or more spherical images. The second set of spherical images may include a second spherical image constructed from the frames of the individual video segments captured during the second key frame moment and/or at least one other spherical image from the frames of the individual video segments captures at a moment adjacent or near the second key frame moment. For example, the at least one other spherical image from the frames of the individual video segments captured at a moment adjacent or near the second key frame moment may include constructing the at least other spherical image from a frame preceding and/or proceeding the frame used to construct the second spherical image. The second set of construction parameter values may be used to construct the at least other spherical image included within the second set of spherical images.

Similarly as discussed above, during construction of the second set of spherical images, multiple frames (e.g., images) may be combined to form a single image (e.g., a single spherical image). Constructing individual spherical images may include processing boundaries between individual frames at a point in time (e.g., the second key frame moment) within the individual video segments from individual image capture devices to construct a continuous and visually indiscernible boundary. That is, the frame at the point in time within each of the individual video segments (each captured by an image capture device with different field of views) may be combined and the boundaries may be processed to form a single spherical image having a 360-degree horizontal field of view and/or a 180-degree vertical field of view. System 100 may be configured to store the second set of spherical images within electronic storage 122 and/or other storage.

The at least one other spherical image constructed from the frames of the individual video segments captured at a moment adjacent or near the first key frame moment may include constructing, using the first set of construction parameters, the at least one other spherical image from the frames of the individual video segments captures at a moment in time between the first key frame moment and the second key frame moment. That is, construction parameter 114 may be configured to continue constructing the first set of spherical images from the frames of the individual video segments at moments in time between the first key frame moment and the second key frame moment using the first set of construction parameter values. In this manner, system 100 may not need to update the construction parameter values at set intervals during the duration of the synchronized time period, but rather when parameters component 112 detects a change in the construction parameter values, as discussed above.

The at least one other spherical image constructed from the frames of the individual video segments captured at a moment adjacent or near the second key frame moment may include constructing, using the second set of construction parameters, the at least one other spherical image from the frames of the individual video segments captured at a moment in time between the first key frame moment and the second key frame moment. As discussed above, construction parameter 114 may be configured to continue constructing the first set of spherical images from the frames of the individual video segments at moments in time between the first key frame moment and the second key frame moment using the first set of construction parameter values. In a similar manner, construction parameter 114 may be configured to continue constructing the second set of spherical images from the frames of the individual video segments at moments in time between the second key frame moment and a third key frame moment using the second set of construction parameter values (e.g., if, for example, another change in construction parameter values is detected relative to the second set of construction parameter values at a moment in time subsequent to the second key frame moment).

Figure 4:
FIG. 4 illustrates an exemplary timeline of a video segment, in accordance with one or more implementations

In some embodiments, construction component 114 may be configured to construct the second set of spherical images using the second set of construction parameters for frames captured at a moment in time before the second key frame moment. This may be because construction parameter values may change gradually over a period of time, but may not be detected by parameters component 112 until an individual construction parameter value exceeds the predefined threshold for that particular construction parameter. For example, and referring to FIG. 4, first key frame moment 402 may be set at 0.01 seconds. System 100 may have determined second key frame moment 404 to be at 6.8 seconds into the duration of the synchronized time period of the individual video segments because parameters component 112 may have detected the change in the construction parameter values for a particular construction parameter (e.g., exposure) at 6.8 seconds. However, at 6.2 seconds (e.g., element 406) into the duration of the synchronized time period of the individual video segments, the construction parameter value for exposure may not exceed the predefined threshold for exposure, but the exposure may have changed enough from the first key frame moment such that the construction parameter value for exposure at 6.2 seconds is closer to the construction parameter value for exposure at 6.8 seconds. In this manner, construction component 114 may be configured to construct the second set of spherical images using the second set of construction parameters for frames between 6.2 seconds and 6.8 seconds, even though key frame component 110 may have identified second key frame moment 404 at 6.8 seconds.

In some embodiments, system 100 may be configured to interpolate construction parameters to obtain a smooth transition between the first key frame moment and the second key frame moment. As discussed above, the first key frame moment and/or the second key frame moment may include a single frame or may include multiple frames within the synchronized time period of the video segment with a fixed set of construction parameters. The construction parameters between the first key frame moment and/or the second key frame moment may be interpolated via linear interpolation, spline interpolation, square interpolation, and/or other forms of interpolation.

System 100 may be configured to determine any number of key frame moments based upon changes in the construction parameter values at various points in time within the synchronized time period of the individual video segments. System 100 may continue to construct the spherical images based upon the construction parameter values at identified key frame moments at the points in time when the changes are detected. System 100 may be configured to provide an override function to a user using system 100 such that the user may manually provide construction parameter values, selection of any of the key frame moments, and/or other manual inputs.

System 100 may be configured to effectuate presentation of a final product (e.g., a final stitched spherical video segment based upon the multiple sets of spherical images) via a display associated with one or more client computing device(s) 104. System 100 may be configured to store the final product within electronic storage 122 and/or other storage.

In some embodiments, system 100 may be configured to stitch the spherical images first without computing construction parameter value changes in order to compute and/or determine construction parameter values changes between frames of the stitched spherical images. In this manner, changes in construction parameter values may be determined faster for errors including stitching errors on overlapping portions of frames for computing camera positions and/or other errors.

Referring again to FIG. 1, in some implementations, server(s) 102, client computing platform(s) 104, and/or external resources 120 may be operatively linked via one or more electronic communication links. For example, such electronic communication links may be established, at least in part, via a network such as the Internet and/or other networks. It will be appreciated that this is not intended to be limiting, and that the scope of this disclosure includes implementations in which server(s) 102, client computing platform(s) 104, and/or external resources 120 may be operatively linked via some other communication media.

A given client computing platform 104 may include one or more processors configured to execute computer program components. The computer program components may be configured to enable a producer and/or user associated with the given client computing platform 104 to interface with system 100 and/or external resources 120, and/or provide other functionality attributed herein to client computing platform(s) 104. By way of non-limiting example, the given client computing platform 104 may include one or more of a desktop computer, a laptop computer, a handheld computer, a NetBook, a Smartphone, a gaming console, and/or other computing platforms.

External resources 120 may include sources of information, hosts and/or providers of virtual environments outside of system 100, external entities participating with system 100, and/or other resources. In some implementations, some or all of the functionality attributed herein to external resources 120 may be provided by resources included in system 100.

Server(s) 102 may include electronic storage 122, one or more processors 124, and/or other components. Server(s) 102 may include communication lines, or ports to enable the exchange of information with a network and/or other computing platforms. Illustration of server(s) 102 in FIG. 1 is not intended to be limiting. Servers(s) 102 may include a plurality of hardware, software, and/or firmware components operating together to provide the functionality attributed herein to server(s) 102. For example, server(s) 102 may be implemented by a cloud of computing platforms operating together as server(s) 102.

Electronic storage 122 may include electronic storage media that electronically stores information. The electronic storage media of electronic storage 122 may include one or both of system storage that is provided integrally (i.e., substantially non-removable) with server(s) 102 and/or removable storage that is removably connectable to server(s) 102 via, for example, a port (e.g., a USB port, a firewire port, etc.) or a drive (e.g., a disk drive, etc.). Electronic storage 122 may include one or more of optically readable storage media (e.g., optical disks, etc.), magnetically readable storage media (e.g., magnetic tape, magnetic hard drive, floppy drive, etc.), electrical charge-based storage media (e.g., EEPROM, RAM, etc.), solid-state storage media (e.g., flash drive, etc.), and/or other electronically readable storage media. The electronic storage 122 may include one or more virtual storage resources (e.g., cloud storage, a virtual private network, and/or other virtual storage resources). Electronic storage 122 may store software algorithms, information determined by processor(s) 124, information received from server(s) 102, information received from client computing platform(s) 104, and/or other information that enables server(s) 102 to function as described herein.

Processor(s) 124 may be configured to provide information processing capabilities in server(s) 102. As such, processor(s) 124 may include one or more of a digital processor, an analog processor, a digital circuit designed to process information, an analog circuit designed to process information, a state machine, and/or other mechanisms for electronically processing information. Although processor(s) 124 is shown in FIG. 1 as a single entity, this is for illustrative purposes only. In some implementations, processor(s) 124 may include a plurality of processing units. These processing units may be physically located within the same device, or processor(s) 124 may represent processing functionality of a plurality of devices operating in coordination. The processor(s) 124 may be configured to execute computer readable instruction components 106, 108, 110, 112, 114, and/or other components. The processor(s) 124 may be configured to execute components 106, 108, 110, 112, 114, and/or other components by software; hardware; firmware; some combination of software, hardware, and/or firmware; and/or other mechanisms for configuring processing capabilities on processor(s) 124.

It should be appreciated that although components 106, 108, 110, 112, and 114 are illustrated in FIG. 1 as being co-located within a single processing unit, in implementations in which processor(s) 124 includes multiple processing units, one or more of components 106, 108, 110, 112, and/or 114 may be located remotely from the other components. The description of the functionality provided by the different components 106, 108, 110, 112, and/or 114 described herein is for illustrative purposes, and is not intended to be limiting, as any of components 106, 108, 110, 112, and/or 114 may provide more or less functionality than is described. For example, one or more of components 106, 108, 110, 112, and/or 114 may be eliminated, and some or all of its functionality may be provided by other ones of components 106, 108, 110, 112, and/or 114. As another example, processor(s) 124 may be configured to execute one or more additional components that may perform some or all of the functionality attributed herein to one of components 106, 108, 110, 112, and/or 114.

Figure 5:
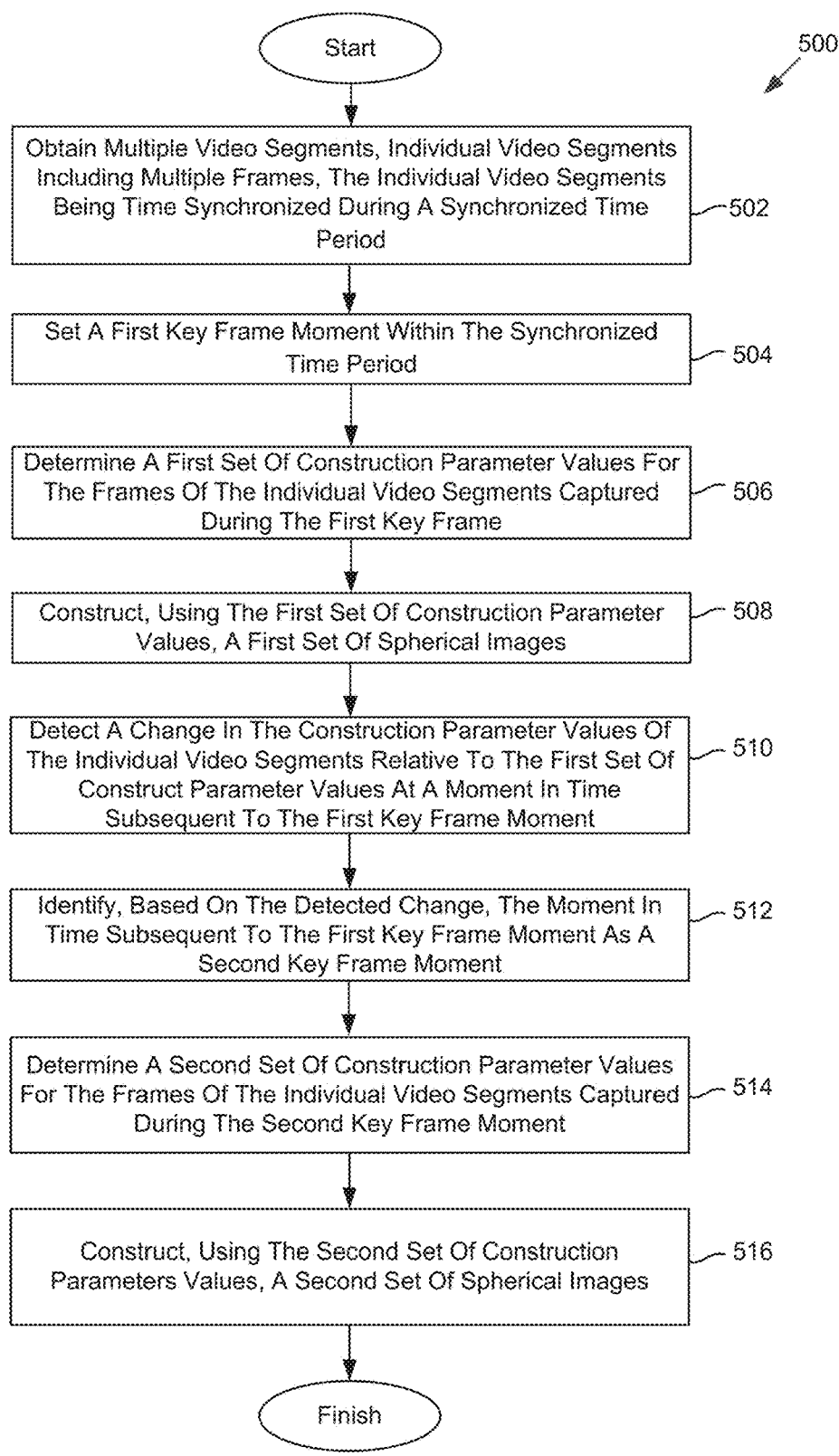
FIG. 5 illustrates a method for determining key frame moments to construct spherical images, in accordance with one or more implementations.

FIG. 5 illustrates a method 500 for determining key frames to construct spherical images, in accordance with one or more implementations. The operations of method 500 presented below are intended to be illustrative. In some implementations, method 500 may be accomplished with one or more additional operations not described, and/or without one or more of the operations discussed. Additionally, the order in which the operations of method 500 are illustrated in FIG. 5 and described below is not intended to be limiting.

In some implementations, method 500 may be implemented in one or more processing devices (e.g., a digital processor, an analog processor, a digital circuit designed to process information, an analog circuit designed to process information, a state machine, and/or other mechanisms for electronically processing information). The one or more processing devices may include one or more devices executing some or all of the operations of method 500 in response to instructions stored electronically on an electronic storage medium. The one or more processing devices may include one or more devices configured through hardware, firmware, and/or software to be specifically designed for execution of one or more of the operations of method 500.

At an operation 502, multiple video segments may be obtained. Individual video segments may include multiple frames. The individual video segments may be time synchronized for at least portions of the individual video segments captured during a synchronized time period. Operation 502 may be performed by a video segment component that is the same as or similar to video segment component 106, in accordance with one or more implementations.

At an operation 504, a first key frame moment within the synchronized time period may be set. Operation 504 may be performed by a key frame component that is the same as or similar to key frame component 110, in accordance with one or more implementations.

At an operation 506, a first set of construction parameter values for the frames of the individual video segments captured during the first key frame moment may be determined. Operation 506 may be performed by a parameters component that is the same as or similar to parameters component 112, in accordance with one or more implementations.

At an operation 508, a first set of spherical images may be constructed using the first set of construction parameter values. The first set of spherical images may include a first spherical image constructed from the frames of the individual video segments captured during the first key frame moment and at least one other spherical image from the frames of the individual video segments captured at a moment adjacent or near the first key frame moment. Operation 508 may be performed by a construction component that is the same as or similar to construction component 114, in accordance with one or more implementations.

At an operation 510, a change in the construction parameter values of the individual video segments may be detected relative to the first set of construction parameter values at a moment in time subsequent to the first key frame moment. Operation 510 may be performed by a parameters component that is the same as or similar to parameters component 112, in accordance with one or more implementations.

At an operation 512, the moment in time subsequent to the first key frame moment may be identified as a second key frame moment based on the detected change in the construction parameter values of the individual video segments relative to the first set of construction parameter values. Operation 512 may be performed by a key frame component that is the same as or similar to key frame component 110, in accordance with one or more implementations.

At an operation 514, a second set of construction parameter values may be determined for the frames of the individual video segments captured during the second key frame moment. Operation 514 may be performed by a parameters component that is the same as or similar to parameters component 112, in accordance with one or more implementations.

At an operation 516, a second set of spherical images may be constructed using the second set of construction parameter values. The second set of spherical images may include a second spherical image constructed from the frames of the individual video segments captured during the second key frame moment and at least one other spherical image from the frames of the individual video segments captured at a moment adjacent or near the second key frame moment. Operation 516 may be performed by a construction component that is the same as or similar to construction component 114, in accordance with one or more implementations.

Although the system(s) and/or method(s) of this disclosure have been described in detail for the purpose of illustration based on what is currently considered to be the most practical and preferred implementations, it is to be understood that such detail is solely for that purpose and that the disclosure is not limited to the disclosed implementations, but, on the contrary, is intended to cover modifications and equivalent arrangements that are within the spirit and scope of the appended claims. For example, it is to be understood that the present disclosure contemplates that, to the extent possible, one or more features of any implementation can be combined with one or more features of any other implementation.

What is claimed is:

1. A system for determining key frame moments to construct spherical images, the system comprising:
   one or more physical computer processors configured by computer readable instructions to:
   obtain multiple video segments, individual video segments including multiple frames, wherein the individual video segments are time synchronized for at least portions of the individual video segments captured during a synchronized time period;
   set a first key frame moment within the synchronized time period;
   determine a first set of stitching parameter values for the frames of the individual video segments captured during the first key frame moment, the first set of stitching parameter values including values of one or more of an image capture device parameter, a color parameter, a stabilization parameter, and/or an exposure parameter;
   construct, using the first set of stitching parameter values, a first set of spherical images, the first set of spherical images including a first spherical image constructed from the frames of the individual video segments captured during the first key frame moment and at least one other spherical image from the frames of the individual video segments captured at a moment adjacent or near the first key frame moment;
   detect a change in the stitching parameter values of the individual video segments relative to the first set of stitching parameter values at a moment in time subsequent to the first key frame moment;
   identify, based on the detected change in the stitching parameter values of the individual video segments relative to the first set of stitching parameter values not being within a predefined threshold, the moment in time subsequent to the first key frame moment as a second key frame moment;
   determine a second set of stitching parameter values for the frames of the individual video segments captured during the second key frame moment; and
   construct, using the second set of stitching parameter values, a second set of spherical images, the second set of spherical images including a second spherical image constructed from the frames of the individual video segments captured during the second key frame moment and at least one other spherical image constructed from the frames of the individual video segments captured at a moment adjacent or near the second key frame moment and preceding the second key moment such that the second set of stitching parameter values are used to construct the at least one other spherical image from the frames of the individual video segments captured at a moment in time between the first key frame moment and the second key frame moment.

2. The system of claim 1, wherein the at least one other spherical image constructed from the frames of the individual video segments captured at a moment adjacent or near the first key frame moment includes constructing, using the first set of stitching parameter values, the at least one other spherical image from the frames of the individual video segments captured at another moment in time between the first key frame moment and the second key frame moment.

3. The system of claim 1, wherein the first set of stitching parameter values includes values of a single parameter, the single parameter being the color parameter.

4. The system of claim 1, wherein the change in the stitching parameter values occurs within at least one of the individual video segments.

5. The system of claim 1, wherein the image capture device parameter value characterizes one or more capture characteristics of image capture devices that captured the multiple video segments, the color parameter value characterizes colors within the frames of the individual video segments, the stabilization parameter value characterizes stabilization shaky movements of one or more of the image capture devices during capture, and the exposure parameter value characterizes exposure of the frames of the individual video segments.

6. The system of claim 5, wherein the image capture device parameter value is based on one or more of an image distortion, a focal length, and/or sensor/lens misalignment.

7. The system of claim 5, wherein the color parameter value is based on color data of the frames of the individual video segments and/or metadata associated with the individual video segments.

8. The system of claim 5, wherein the color parameter value is based on a histogram of color data for the frames of the individual video segments.

9. The system of claim 1, wherein the one or more physical computer processors are, to detect the change in the stitching parameter values of the individual video segments relative to the first set of stitching parameter values at the moment in time subsequent to the first key frame moment, further configured by the computer readable instructions to determine whether a change in at least one of the stitching parameter values of individual frames of the individual video segments at the moment in time subsequent to the first key frame moment is not within the predefined threshold for the at least one of the stitching parameter values.

10. The system of claim 1, wherein the stitching parameter values include an image parameter value, the image parameter value being based on one or more of exposure, white balance, noise level, sharpness, and/or saturation of the frames of the individual video segments.

11. A method for determining key frame moments to construct spherical images, the method comprising:
   obtaining multiple video segments, individual video segments including multiple frames, wherein the individual video segments are time synchronized for at least portions of the individual video segments captured during a synchronized time period;

setting a first key frame moment within the synchronized time period;

determining a first set of stitching parameter values for the frames of the individual video segments captured during the first key frame moment, the first set of stitching parameter values including values of one or more of an image capture device parameter, a color parameter, a stabilization parameter, and/or an exposure parameter;

constructing, using the first set of stitching parameter values, a first set of spherical images, the first set of spherical images including a first spherical image constructed from the frames of the individual video segments captured during the first key frame moment and at least one other spherical image from the frames of the individual video segments captured at a moment adjacent or near the first key frame moment;

detecting a change in the stitching parameter values of the individual video segments relative to the first set of stitching parameter values at a moment in time subsequent to the first key frame moment;

identifying, based on the detected change in the stitching parameter values of the individual video segments relative to the first set of stitching parameter values not being within a predefined threshold, the moment in time subsequent to the first key frame moment as a second key frame moment;

determining a second set of stitching parameter values for the frames of the individual video segments captured during the second key frame moment; and constructing, using the second set of stitching parameter values, a second set of spherical images, the second set of spherical images including a second spherical image constructed from the frames of the individual video segments captured during the second key frame moment and at least one other spherical image constructed from the frames of the individual video segments captured at a moment adjacent or near the second key frame moment and preceding the second key moment such that the second set of stitching parameter values are used to construct the at least one other spherical image from the frames of the individual video segments captured at a moment in time between the first key frame moment and the second key frame moment.

12. The method of claim 11, wherein the at least one other spherical image constructed from the frames of the individual video segments captured at a moment adjacent or near the first key frame moment includes constructing, using the first set of stitching parameter values, the at least one other spherical image from the frames of the individual video segments captured at another moment in time between the first key frame moment and the second key frame moment.

13. The method of claim 11, wherein the first set of stitching parameter values includes values of a single parameter, the single parameter being the color parameter.

14. The method of claim 11, wherein the change in the stitching parameter values occurs within at least one of the individual video segments.

15. The method of claim 11, wherein the image capture device parameter value characterizes one or more capture characteristics of image capture devices that captured the multiple video segments, the color parameter value characterizes colors within the frames of the individual video segments, the stabilization parameter value characterizes stabilization shaky movements of one or more of the image capture devices during capture, and the exposure parameter value characterizes exposure of the frames of the individual video segments.

16. The method of claim 15, wherein the image capture device parameter value is based on one or more of an image distortion, a focal length, and/or sensor/lens misalignment.

17. The method of claim 15, wherein the color parameter value is based on color data of the frames of the individual video segments and/or metadata associated with the individual video segments.

18. The method of claim 15, wherein the color parameter value is based on a histogram of color data for the frames of the individual video segments.

19. The method of claim 11, wherein the detecting the change in the stitching parameter values of the individual video segments relative to the first set of stitching parameter values at the moment in time subsequent to the first key frame moment includes determining whether a change in at least one of the stitching parameter values of individual frames of the individual video segments at the moment in time subsequent to the first key frame moment is not within the predefined threshold for the at least one of the stitching parameter values.

20. The method of claim 11, wherein the stitching parameter values include an image parameter value, the image parameter value being based on one or more of exposure, white balance, noise level, sharpness, and/or saturation of the frames of the individual video segments.

* * * * *